United States Patent [19]

Tattersall

[11] 4,166,515
[45] Sep. 4, 1979

[54] SIDEWALL GAS-CUSHION VEHICLES

[75] Inventor: Edward G. Tattersall, Southampton, England

[73] Assignee: Hovermarine Transport Limited, Hampshire, England

[21] Appl. No.: 781,814

[22] Filed: Mar. 28, 1977

[30] Foreign Application Priority Data

Mar. 29, 1976 [GB] United Kingdom ............... 12490/76

[51] Int. Cl.² ............................................... B60V 1/11
[52] U.S. Cl. ..................................... 180/119; 180/126;
114/67 A
[58] Field of Search ............... 180/116, 117, 119, 126;
114/61, 66.5 H, 122, 126, 67 A, 67 R, 282

[56] References Cited

U.S. PATENT DOCUMENTS

| 3,117,545 | 1/1964 | Warner | 180/116 X |
| 3,211,124 | 10/1965 | Mantle | 180/116 X |
| 3,288,236 | 11/1966 | Padial | 180/126 |
| 3,456,611 | 7/1969 | Johnson | 114/282 X |
| 3,583,520 | 6/1971 | Kirpitznikoff | 180/116 X |
| 3,807,339 | 4/1974 | Howells | 114/67 A |
| 3,871,317 | 3/1975 | Szpytman | 114/67 R X |

FOREIGN PATENT DOCUMENTS

| 1236030 | 6/1971 | United Kingdom | 180/119 |
| 1236101 | 6/1971 | United Kingdom | 180/119 |

*Primary Examiner*—Francis S. Husar
*Assistant Examiner*—Terrance L. Siemens
*Attorney, Agent, or Firm*—Steele, Gould & Fried

[57] ABSTRACT

A sidewall gas-cushion vehicle is provided with hydrofoils carried in recesses defined by the sidewalls and capable of being extended into an operable position or of being retracted into an inoperative position. The foils may be used to generate lift forces and/or to counter unwanted movements of the vehicle, such as heave, roll and pitching motions. The lift forces can be made positive or negative.

6 Claims, 4 Drawing Figures

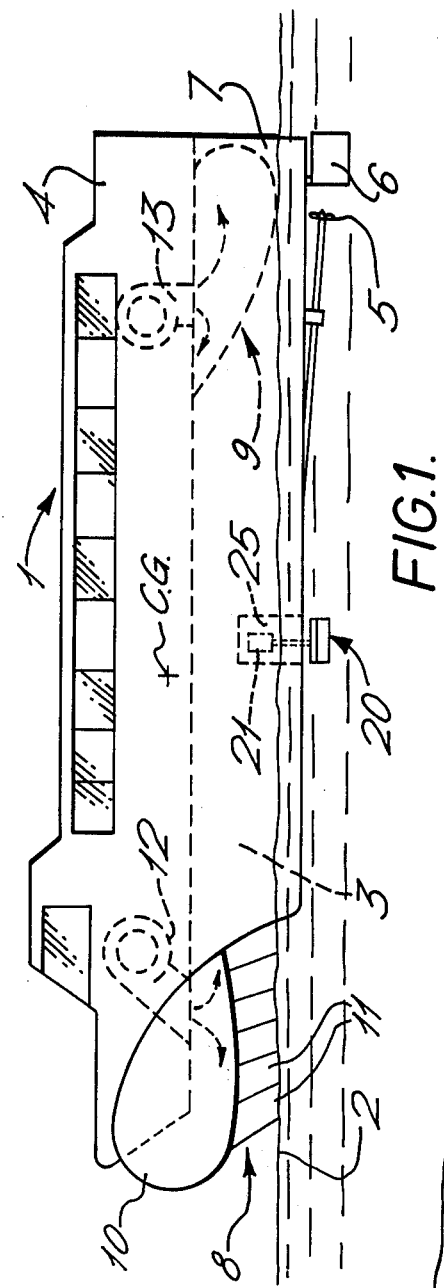
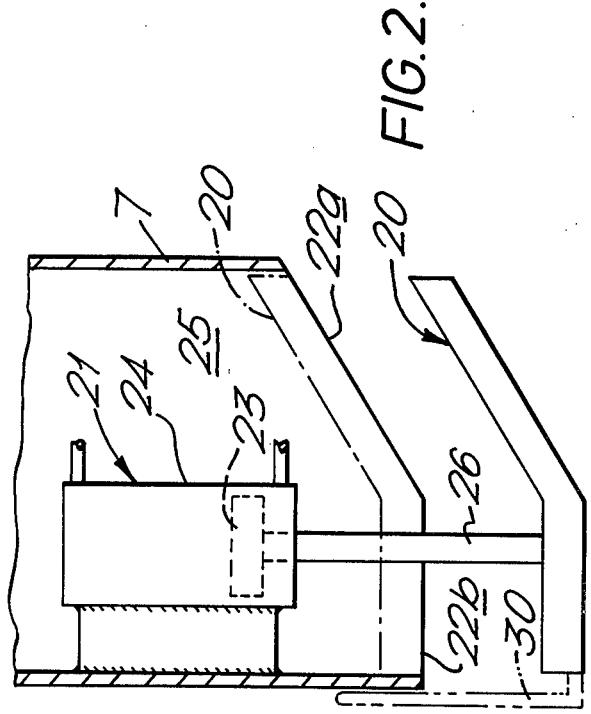

SIDEWALL GAS-CUSHION VEHICLES

BACKGROUND OF THE INVENTION

This invention relates to sidewall gas-cushion vehicles, that is to say, to vehicles for travelling over a surface wherein, in operation, are supported above that surface, at least in part, by a cushion of pressurised gas, for example, air, formed and contained between the vehicle body and the surface, and wherein the sides of each of the vehicle-supporting cushion is contained by a pair of laterally-spaced (side) wall structures extending longitudinally along the sides of the vehicle body in substantially parallel array and depending therefrom so as to dip into the water and form a cushion-gas seal.

The vehicle-supporting cushion may be contained, at least in part, by a flexible wall structure or skirt attached to and depending from the vehicle body.

SUMMARY OF THE INVENTION

According to the invention, a sidewall gas-cushion vehicle is provided with hydrodynamic means carried by the sidewalls and capable of being extended into an operable position or of being retracted into an inoperative position.

The hydrodynamic means may be used to generate lift forces and/or to counter unwanted movements of the vehicle, such as heave, roll and pitching motions. The lift forces can be positive or negative.

BRIEF DESCRIPTION OF THE DRAWINGS

The invention will now be described by way of example only with reference to the accompanying drawings, wherein:

FIG. 1 is a side view of a sidewall gas-cushion vehicle,

FIG. 2 is an enlarged bow-end view, in medial section, of part of one of the sidewalls thereof.

In the figures, like reference numerals refer to like components.

DETAILED DESCRIPTION OF THE PREFERRED EMBODIMENT

Figure 3:
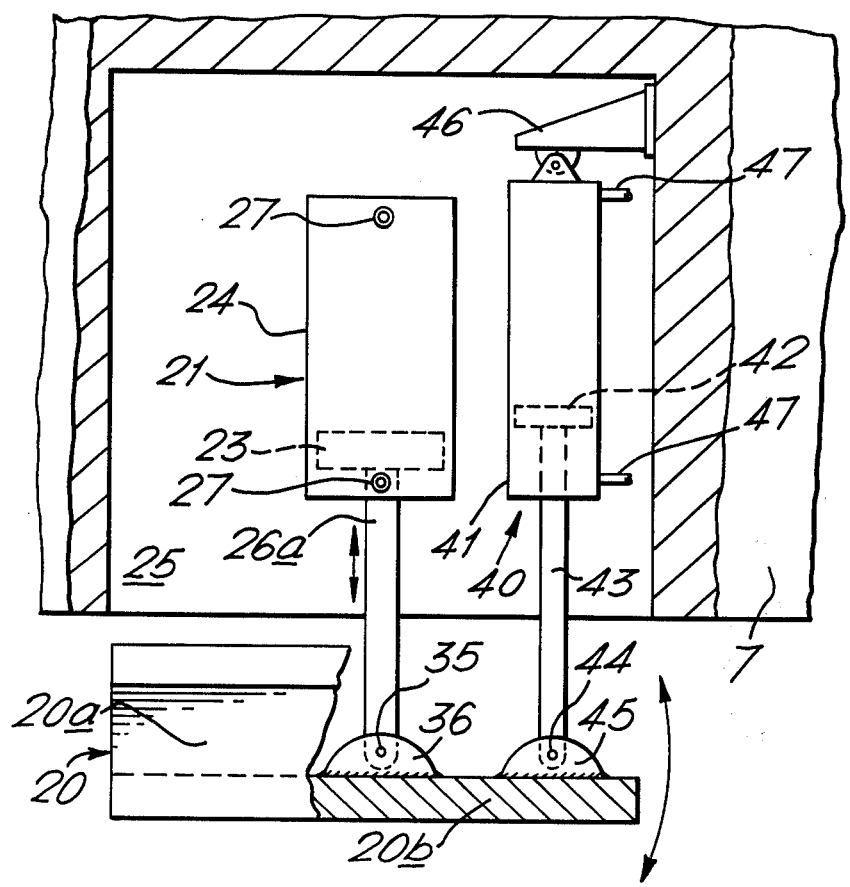
FIG. 3 is an enlarged side view, partly in medial section, of one of the sidewalls, and illustrates a modification.

Referring first to FIG. 1, a sidewall gas-cushion vehicle 1 is shown travelling over the surface 2 of water, supported by a cushion 3 of pressurised gas (air) formed and contained between the vehicle body 4 and the surface 2. The vehicle 1 is propelled by a pair of water-screw propellers 5 and is steered by a pair of rudders 6.

The sides of the vehicle-supporting cushion 3 are contained by a pair of laterally-spaced sidewall structures 7 extending longitudinally along the sides of the vehicle body 4 in substantially parallel array. The sidewalls 7 depend from the sides of the vehicle body 4 so as to dip into the water and form a cushion seal. Each sidewall 7 carries a water-screw propeller 5 and a rudder 6.

The front or bow end of the cushion 3 is contained by a flexible skirt 8 and the rear or stern end thereof by a flexible skirt 9. The skirts 8, 9, which are of hollow, inflatable form, and constructed from rubberised fabric, extend laterally between (and in the case of the skirt 8, beyond as well) the front and rear ends of the sidewalls 7. The skirts 8, 9 are attached to the vehicle body 4 and depend therefrom. Flexible skirt 8 is in light contact with the water surface 2. The flexible skirt 9 is maintained clear of the surface 2.

The front flexible skirt 8 is of two-stage form and comprises an inflated bag 10 from which depend a succession of independently-deflectable flexible wall or skirt members 11 of the form disclosed by British Patent No. 1,043,351. (U.S. Pat. No. 3,420,330 of Bliss corresponds). Air forming the vehicle-supporting cushion 3 is provided by a pair of centrifugal fans 12 disposed side by side. Air from the fans 12 passes through the flexible skirt 8 to inflate it before entering the space occupied by the cushion 3. The rear flexible skirt 9 is inflated by air supplied by a centrifugal fan 13.

With additional reference to FIG. 2, in accordance with the invention, the vehicle 1 is provided with hydrodynamic means comprising a hydrofoil 20 carried by each sidewall 7. Each hydrofoil 20 is capable of being extended, by means of an actuator 21, into an operable position (as shown in full lines) or of being retracted into an inoperative position (as shown in dotted lines).

The hydrofoils 20 are disposed symmetrically adjacent a transverse plane passing through the center of gravity (C.G.) of the vehicle 1. The bottom edge of each sidewall 7 has a downwardly and inwardly sloping surface 22a and a horizontally-extending surface 22b and the lateral cross-section of each hydrofoil 20 is of corresponding shape. Accordingly, when retracted, the bottom of the hydrofoil 20 is substantially flush with the bottom edge of its associated sidewall 7.

Each actuator 21 is disposed within a hollow (watertight) portion or recess 25 of its associated sidewall 7. The actuators 21 comprise piston (23) and cylinder (24) actuators employing hydraulic fluid as an actuating medium but they may be replaced by other forms of (suitable) actuators. The hydrofoils 20 are connected to the pistons 23 of the actuators 21 by elongated piston rods 26. Inasmuch as the bottom of the hydrofoil 20 is substantially flush with the bottom edge of its associated sidewall 7, the hydrafoil 20 closes off the recess 25 when retracted, as shown in FIG. 2.

In operation, when the vehicle 1 is travelling over the water 2, the hydrofoils 20 are extended into their operative positions, so as to generate positive lift forces which assist the cushion 3 in supporting the vehicle. As explained hereinafter, the hydrofoils 20 can also be used to generate negative lift forces.

In addition, however, and when extended, the hydrofoils 20 serve as dampers so as to counter unwanted motions of the vehicle, for example, heave or roll forces.

Such damping may be "inherent" in the sense that the actuators 21 are used only to fully extend the hydrofoils 20 and damping results from movement of the hydrofoils 20 tending to compress the hydraulic fluid in the actuators 21. On the other hand, by use of control means sensitive to unwanted motions of the vehicle, and using devices such as gyroscopes and accelerometers, the actuators 21 can be used to move the hydrofoils 20 up or down, either singly or in combination, so as to counter said unwanted motions. Attitude changes of the hydrofoil 20 can also be effected, or ventilated control of its lift coefficient.

Figure 4:
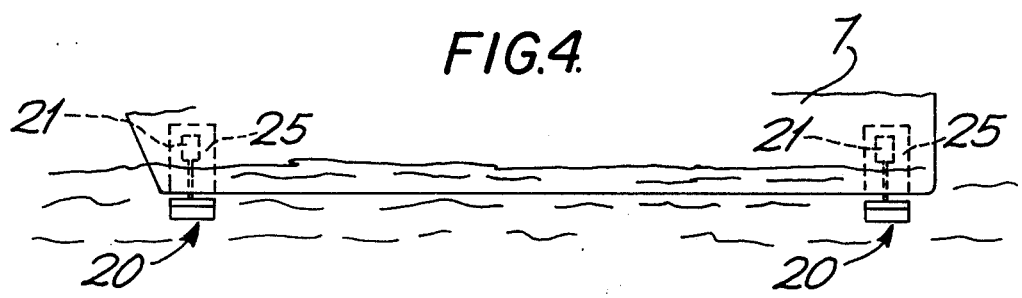
FIG. 4 is a fragmentary side view of a sidewall and illustrates a further modification.

With reference to FIG. 4, hydrofoils 20 may be disposed at forward and rearward regions of the sidewalls in order to counter unwanted pitch motions.

To prevent escape of cushion air from beneath the sidewalls 7 under adverse wave conditions, barrier plates 30 may be fitted to the sidewalls 7 or, (as shown), to the hydrofoils 20. The plates 30 may extend partially or wholly along the sidewalls, depending on requirements.

FIG. 3 illustrates a modification wherein the angle of incidence of a hydrofoil 20 can be varied from positive to negative, and vice-versa.

In this modification the hydrofoil 20 is pivotally connected to the piston rod 26a by means of a pin 35 and bracket 36 welded to the hydrofoil. This arrangement allows the hydrofoil 20 to be moved, about a substantially horizontal axis, by a hydraulically-operated actuator 40 comprising a cylinder 41, piston 42 and piston rod 43. The piston rod 43 is connected to the hydrofoil 20 by a pin 44 and bracket 45 welded to the hydrofoil. To accommodate any lateral movement of the piston rod 43 as it is moved up or down, the cylinder 41 is pivotally-mounted in the hollow portion 25, by means of a bracket 46.

FIG. 3 also shows that the actuators 24 and 40 are provided with hydraulic delivery/discharge lines 27 and 47 respectively. FIG. 3 also identifies the sloping (20a) and horizontal (20b) parts of a hydrofoil 20.

I claim:

1. A gas-cushion vehicle, provided with sidewalls, comprising:
   hydrodynamic means for generating lift forces;
   the sidewalls defining recesses for receiving the hydrodynamic means and having bottom portions with downwardly and inwardly sloping surfaces, each of the hydrodynamic means having a bottom of corresponding form; and,
   means for extending the hydrodynamic means from said recesses into operable positions below the sidewalls and for retracting the hydrodynamic means into inoperative positions within the recesses, whereby the hydrodynamic means enclose said recesses and are substantially flush with the bottom portions of the sidewalls.

2. A vehicle as claimed in claim 1, wherein the hydrodynamic means are operable to counter unwanted movements of the vehicle, thereby damping heave, roll and pitching motions.

3. A vehicle as claimed in claim 1, further comprising means operable to change the lift forces generated by the hydrodynamic means from positive to negative and negative to positive.

4. A vehicle as claimed in claim 1, wherein the hydrodynamic means are disposed adjacent a transverse plane passing through the center of gravity of the vehicle.

5. A vehicle as claimed in claim 1, wherein the hydrodynamic means are disposed at forward and rearward regions of the sidewalls.

6. A vehicle as claimed in claim 1, further comprising barrier means carried by the hydrodynamic means and operable to form a cushion fluid seal between the hydrodynamic means, when extended, and its associated sidewall.

* * * * *